Oct. 6, 1964  H. C. MULTER  3,151,871
CHUCK
Filed Oct. 19, 1961
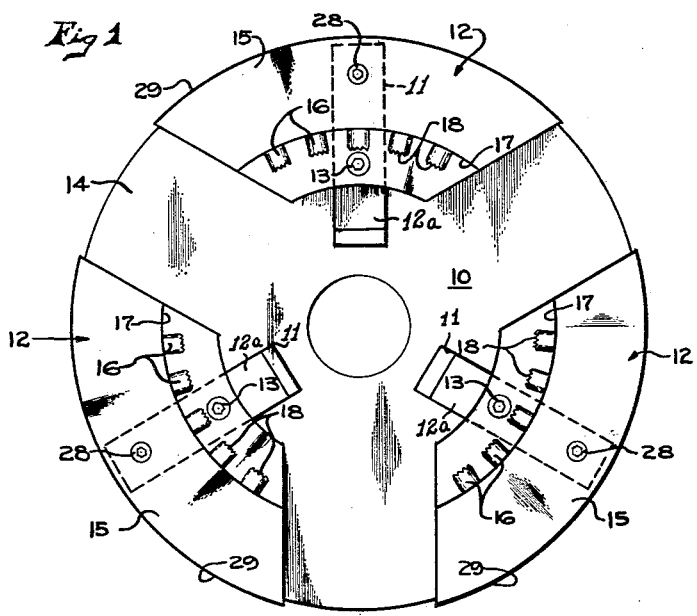
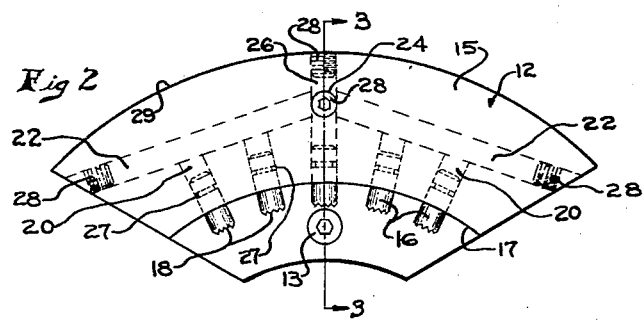
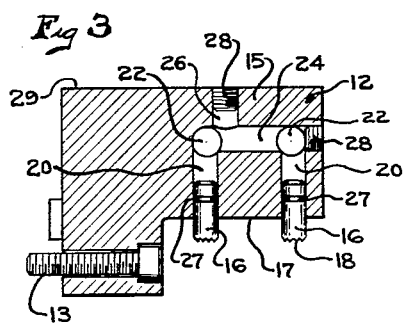
INVENTOR.
HOWARD C. MULTER
BY *Lindsay, Pretzman & Hayes*
ATTORNEYS

United States Patent Office 3,151,871
Patented Oct. 6, 1964

3,151,871
CHUCK
Howard C. Multer, West Hartford, Conn., assignor to Skinner Precision Industries, Inc., New Britain, Conn., a corporation of Connecticut
Filed Oct. 19, 1961, Ser. No. 146,299
4 Claims. (Cl. 279—123)

This invention generally relates to chucking devices of the type having a plurality of relatively movable jaws particularly suited for holding thin-wall and irregularly shaped objects.

It is a principal object of this invention to provide an improved chuck jaw which distributes the holding forces over a large workpiece area thereby enabling thin-walled or other fragile workpieces to be firmly retained without damage or distortion.

It is another object of this invention to provide a chuck having an improved jaw construction that automatically adjusts to the contour of irregularly shaped workpieces to distribute the holding force over a large area of the workpiece without requiring special attachments or accessories for the chuck.

It is a further object of this invention to provide an improved chuck having a plurality of relatively movable jaws which permit adjustment of the spacing between the gripping faces of the jaws without necessitating movement of the jaws themselves.

It is a still further object of this invention to provide an improved compensating jaw for use with irregularly shaped or fragile workpieces, which jaw can be easily installed as a replacement for the jaws in existing chucks.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawing:

FIG. 1 is a plan view of the face of a preferred embodiment of the chuck of this invention;

FIG. 2 is an enlarged view of a single jaw of the chuck of FIG. 1; and

FIG. 3 is a cross section view of the jaw taken substantially along the line 3—3 of FIG. 2.

Referring now to the drawing, a chuck, generally designated by the numeral 10, has a plurality of jaws 12 mounted upon the chuck body 14 for movement toward and away from the central axis of the body for clamping and releasing a workpiece (not shown) positioned therebetween. The jaws 12 are retained by suitable fastening means 13 on master jaws 12a, the master jaws 12a being slideable in radially disposed guideways 11 in the chuck body 14 and adjusted for clamping or releasing a workpiece in any desired manner, as for example, that shown in the U.S. Patent 2,993,701 to Harold L. Arnold assigned to the assignee of the present invention.

In accordance with the illustrated embodiment of this invention, each of the jaws 12 has a body extension 15 forming a portion of an annular ring having an inwardly facing circumferentially extending face 17. Slidably mounted in cylindrical chambers 20 drilled radially of the circumferential face 17 within the extension 15 are a plurality of clamping pistons or plungers 16. Preferably, each of the pistons 16 has its outer face 18 serrated for providing a gripping surface engageable with a workpiece disposed upon the chuck body. In the embodiment shown, each chuck jaw 12 is provided with two spaced rows of pistons 16 arranged generally parallel to the work face of the chuck body with each row having five pistons equally spaced along the face 17 of each jaw extension 15. A passageway 22 in the extension 15 connects the inner ends of each row of cylindrical chambers 20, and an axially extending passage 24 in each jaw centrally connects the spaced passageways 22. Another passage 26 extends outwardly from the passage 24 to the outer or rear surface 29 of the jaw. Passageway 22 and the passages 24 and 26 are suitably closed as by threaded plugs 28.

The chambers 20 inwardly of the pistons 16 and the passages 22, 24 and 26 are filled with a suitable force-transmitting medium thereby providing a force-transmitting constant volume circuit interconnecting each piston with each other piston. The force transmitting medium is preferably a heavy oil but could be any other desired mediums such as small pellets or balls that transmit substantially equal pressures to the inner ends of the clamping pistons. Where necessary, the pistons can be provided with annular seals 27 such as O-ring seals for preventing leakage of the force transmitting medium past the pistons and suitable stops (not shown) can be provided to limit outward travel of each piston.

As the chuck jaws 12 are moved inwardly to clamp an irregularly shaped workpiece therebetween, one or more, but usually less than all, of the pistons will contact the workpiece and move inwardly within the chambers 20 thereby exerting a force on the hydraulic fluid to move the remaining pistons outwardly until all the pistons engage the workpiece. Further inward movement of the chuck jaws will provide the desired clamping engagement of the pistons with the workpiece with the clamping forces distributed substantially equally between all the pistons. Therefore, notwithstanding irregularities in the surface of the workpiece clamped between the jaws, all the pistons engage the workpiece to widely distribute the clamping forces so that even thin-walled or other fragile workpieces can be securely retained by the jaws without damage or distortion, even though these workpieces are irregularly shaped. Thus, each jaw has a plurality of workpiece engaging faces which automatically shift in position to compensate for workpiece irregularities.

By controlling the quantity of the hydraulic medium within each jaw, the average extension of the pistons from the face 17 of the jaw can be controlled. Normally, it will be desirable to place equal quantities of the hydraulic medium in each jaw; however, where a workpiece is to be eccentrically positioned upon the chuck or has an irregular contour, it may be desirable to place a larger quantity of the medium in one or more of the jaws in order to properly position or center the workpiece on the chuck. When adjustment of the closed circuit volume is not convenient or desirable, precise adjustments in plunger position can be made in each jaw by adjusting one of the plugs 28, the plug 28 in the passage 26 being normally the most accessible. The latter adjustment maintains the volume of the closed circuit in each jaw and permits accurate adjustment of the projected length of the pistons and permits convenient and precise centering of eccentrically shaped workpieces by coordinate movement of a plug on each jaw.

It is, therefore, seen that the chuck jaw of this invention enables a chuck using one or more of the improved jaws to distribute the clamping forces on a workpiece disposed thereon over a large area so as to avoid any force concentration which might damage or distort fragile or thin workpieces. Additionally, by providing a number of movable clamping pistons, the chuck jaw allows irregularly shaped workpieces to be adequately clamped without requiring special chuck accessories or attachments. Further, by providing means for adjusting the average extension of the clamping pistons from the jaw, a readily operable and precise centering adjustment is available which is independent of the conventional chuck jaw adjustment mechanism.

As will be apparent to persons skilled in the art, various modifications and adaptations of the structure above described will become readily apparent without departure from the spirit and scope of the invention, the scope of which is defined in the appended claims.

I claim:
1. A chuck comprising a chuck body, a plurality of radially displaceable jaws angularly positioned about a central chuck body axis and engageable with a workpiece, at least one of the jaws being a self-compensating jaw having a plurality of cylindrical chambers extending generally radially from the central chuck body axis and opening toward the workpiece, clamping pistons engageable with the workpiece and slidably mounted in the cylindrical chambers for movement toward and away from the workpiece, the cylindrical chambers being positioned to provide two axially spaced rows thereon, jaw passages interconnecting the chambers, and a substantially incompressible medium in the jaw passages for transmitting forces between the clamping pistons to automaticaly adjust the pistons to the contour of the workpiece.

2. The chuck as set forth in claim 1 wherein three jaws are mounted on the body at 120° intervals and each of the jaws is a self-compensating jaw having adjusting means longitudinally movable within the passages for selectively varying the volume of the medium therein to adjust the piston extension for accurately centering the workpiece.

3. A chuck comprising a chuck body, a plurality of radially displaceable jaws angularly positioned on the chuck body about a central axis thereof, a plurality of pistons on the jaws extending generally radially inwardly for clamping and centering a workpiece positioned between the jaws, the pistons being mounted for movement toward and away from the workpiece, a plurality of interconnecting passages formed within the jaws for establishing communication with the movable pistons, a substantially incompressible medium in the passages for transmitting forces between the pistons to automatically adjust the pistons to the contour of the workpiece, and adjusting means longitudinally movable within the passages for selectively varying the volume of the medium therein to thereby extend and retract the pins relative to the jaw for accurately centering the workpiece.

4. A chuck comprising a chuck body, three radially displaceable jaws equi-angularly spaced on the chuck body about a central axis thereof, a pluarlity of cylindrical chambers on the jaws opening inwardly toward a workpiece positioned between the jaws and extending generally radially from a central axis of the chuck body, movable pistons for clamping and centering the workpiece slideably mounted in the chambers for movement toward and away from the workpiece, jaw passages forming a single interconnecting circuit within each jaw for establishing communication with the chambers of the pistons, a hydraulic fluid in the passages for transmitting forces between the pistons to automatically adjust the pistons to the contour of the workpiece, and a plurality of plugs on each jaw received in the passages and longitudinally movable therein for selectively varying the volume of fluid within the chambers to adjust the extension of the pistons relative to the jaw for precisely centering the workpiece.

References Cited in the file of this patent
UNITED STATES PATENTS

| | | |
|---|---|---|
| 1,453,176 | Perrine | Apr. 24, 1923 |
| 2,323,091 | Johnston | June 29, 1943 |
| 2,587,893 | Pridy | Mar. 4, 1952 |
| 2,826,420 | Klinger | Mar. 11, 1958 |
| 2,882,771 | Blazek | Apr. 21, 1959 |
| 3,025,071 | Larrad | Mar. 13, 1962 |

FOREIGN PATENTS

| | | |
|---|---|---|
| 348,379 | Switzerland | Sept. 30, 1960 |